(12) United States Patent
Bruce et al.

(10) Patent No.: US 7,941,499 B2
(45) Date of Patent: May 10, 2011

(54) INTERPROCESSOR MESSAGE TRANSMISSION VIA COHERENCY-BASED INTERCONNECT

(75) Inventors: Becky G. Bruce, Leander, TX (US);
Sanjay R. Deshpande, Austin, TX (US);
Michael D. Snyder, Austin, TX (US);
Gary L. Whisenhunt, Austin, TX (US);
Kumar Gala, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 906 days.

(21) Appl. No.: 11/682,867

(22) Filed: Mar. 6, 2007

(65) Prior Publication Data

US 2008/0222389 A1    Sep. 11, 2008

(51) Int. Cl.
*G06F 15/167* (2006.01)

(52) U.S. Cl. ......... 709/213; 709/212; 709/216; 711/146

(58) Field of Classification Search .................. 709/212, 709/213, 216; 711/146
See application file for complete search history.

(56) References Cited

U.S. PATENT DOCUMENTS

| | | | |
|---|---|---|---|
| 6,332,165 B1 * | 12/2001 | Hagersten et al. | 709/238 |
| 6,996,681 B1 * | 2/2006 | Autechaud | 711/141 |
| 7,076,597 B2 * | 7/2006 | Webb et al. | 711/141 |
| 7,484,043 B2 * | 1/2009 | Heller, Jr. et al. | 711/141 |
| 2001/0051977 A1 * | 12/2001 | Hagersten | 709/203 |
| 2005/0160430 A1 * | 7/2005 | Steely et al. | 719/310 |
| 2005/0198187 A1 * | 9/2005 | Tierney et al. | 709/214 |

FOREIGN PATENT DOCUMENTS

WO     99/35581 A1     7/1999

OTHER PUBLICATIONS

IBM, "Chapter 9. Processor Control," Power ISA, Book III-E, Version 2.03, Sep. 29, 2006, pp. 599-601.

* cited by examiner

*Primary Examiner* — Phuoc Nguyen

(57) ABSTRACT

A method includes communicating a first message between processors of a multiprocessor system via a coherency interconnect, whereby the first message includes coherency information. The method further includes communicating a second message between processors of the multiprocessor system via the coherency interconnect, whereby the second message includes interprocessor message information. A system includes a coherency interconnect and a processor. The processor includes an interface configured to receive messages from the coherency interconnect, each message including one of coherency information or interprocessor message information. The processor further includes a coherency management module configured to process coherency information obtained from at least one of the messages and an interrupt controller configured to generate an interrupt based on interprocessor message information obtained from at least one of the messages.

20 Claims, 3 Drawing Sheets

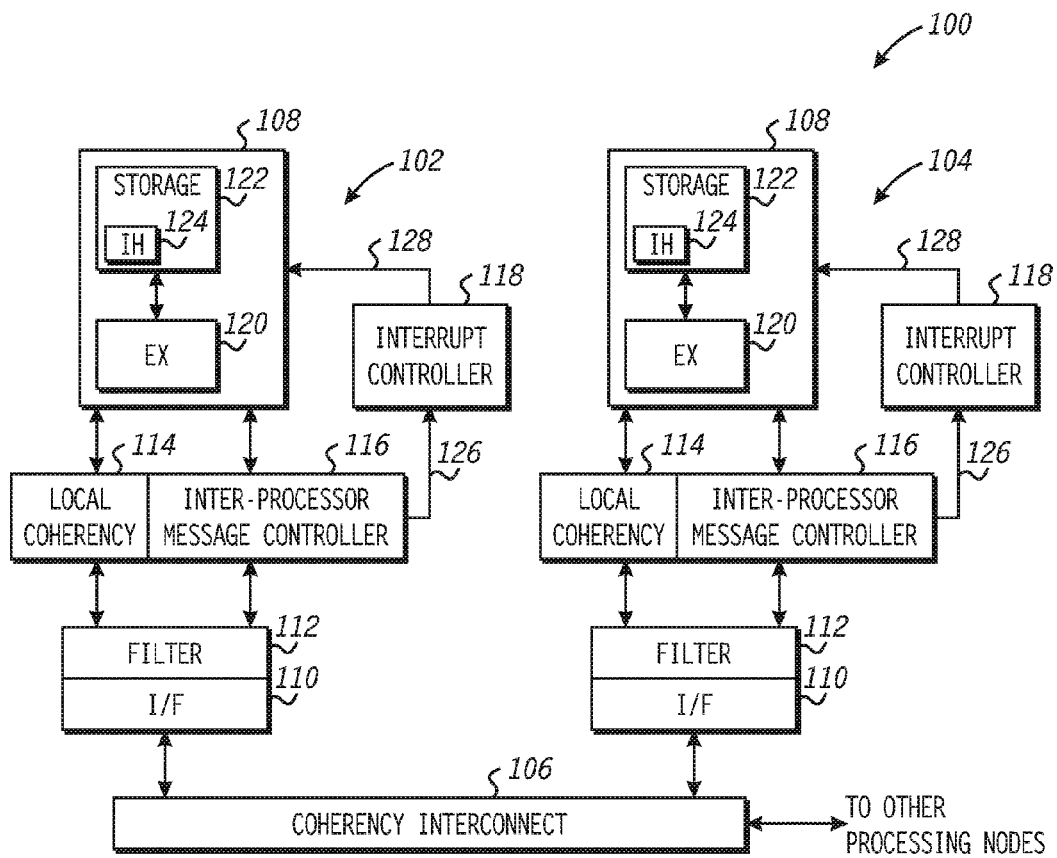
FIG. 1
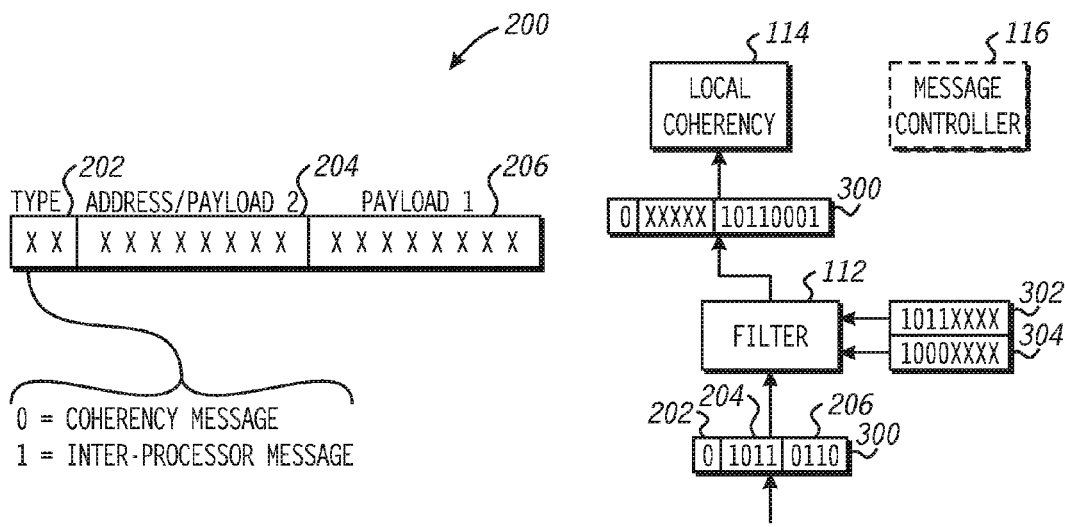
FIG. 2
FIG. 3

US 7,941,499 B2

INTERPROCESSOR MESSAGE TRANSMISSION VIA COHERENCY-BASED INTERCONNECT

FIELD OF THE DISCLOSURE

The present disclosure relates generally to multiprocessor systems and more particularly to interprocessor message and coherency message transmission in multiprocessor systems.

BACKGROUND

Dedicated interprocessor messaging interconnects frequently are used in multi-processor systems to communicate messages between processors. Typically, the interprocessor messaging interconnect is implemented as a dedicated interconnect separate from other interconnects, such as the coherence mechanism used to facilitate cache coherency in a multiprocessor system having shared memory. In certain multiprocessing environments, such as in systems utilizing virtual processors, the routing of inter-processing messages can be complex, which impedes efficient operation. For message-passing between virtual processors, a conventional dedicated interprocessor messaging interconnect often must have a priori knowledge of the physical identifiers (IDs) of the virtual processor, as well as knowledge of the interconnect topology and routing. Acquiring this information and configuring the message routing therefore can require a substantial number of memory accesses, thereby reducing the overall bandwidth of the processor-memory connection. This problem is exacerbated during start-up as the routing tables of the interprocessor messaging connect may not yet be complete or accurate. Further, in some implementations, the dedicated interprocessor messaging interconnect is subject to security breaches due to their reliance on generic messages to communicate between a messaging agent and a security device. Unauthorized access to the security device therefore can be accomplished by transmitting fake messages that take advantage of the generic nature of the message format. Accordingly, an improved technique for interprocessor message passing would be advantageous.

BRIEF DESCRIPTION OF THE DRAWINGS

The present disclosure may be better understood, and its numerous features and advantages made apparent to those skilled in the art by referencing the accompanying drawings.

FIG. 1 is a block diagram illustrating a processing node of a multiprocessor system in accordance with at least one embodiment of the present disclosure.

FIG. 2 is a diagram illustrating an example dual-mode message format in accordance with at least one embodiment of the present disclosure.

FIG. 3 is a diagram illustrating handling of a coherency message from a shared coherency/interprocessor messaging interconnect in accordance with at least one embodiment of the present disclosure.

The use of the same reference symbols in different drawings indicates similar or identical items.

DETAILED DESCRIPTION

Figure 4:
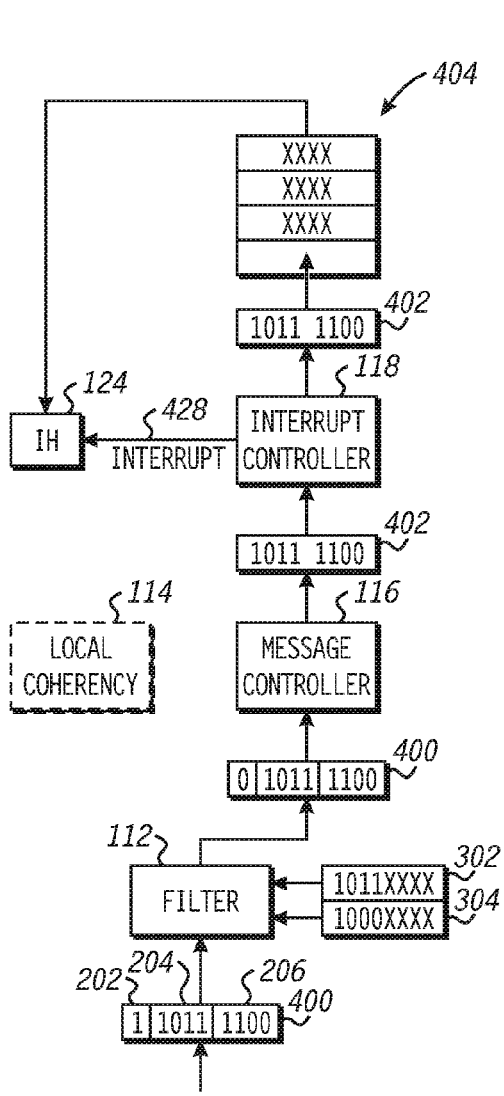
FIG. 4 is a diagram illustrating handling of an interprocessor message from a shared coherency/interprocessor messaging interconnect in accordance with at least one embodiment of the present disclosure.

In accordance with one aspect of the present disclosure, a method includes communicating a first message between processors of a multiprocessor system via a coherency interconnect, whereby the first message includes coherency information. The method further includes communicating a second message between processors of the multiprocessor system via the coherency interconnect, whereby the second message includes interprocessor message information.

In accordance with another aspect of the present disclosure, a method includes receiving, at a processor of a multiprocessor system, a message via a coherency interconnect and accessing a type field of the message to determine whether the message includes coherency information or interprocessor message information. The method additionally includes performing a coherency action at the processor based on the coherency information in response to determining the message includes coherency information, and selectively processing the interprocessor message information at the processor in response to determining the message includes the interprocessor message information.

In accordance with another aspect of the present disclosure, a system includes a coherency interconnect and a processor. The processor includes an interface configured to receive messages from the coherency interconnect, each message including one of coherency information or interprocessor message information. The processor further includes a coherency management module configured to process coherency information obtained from at least one of the messages and an interrupt controller configured to generate an interrupt based on interprocessor message information obtained from at least one of the messages.

FIGS. 1-7 illustrate exemplary techniques whereby the topology and routing information maintained by a coherency interconnect for purposes of coherency transactions can further be utilized for the communication of interprocessor messages. In one embodiment, the coherency interconnect is configured to transmit both coherency information and interprocessor message information using the same message format. In response to receiving a message (hereinafter referred to as a dual-mode message), the receiving processor is configured to determine the message type (e.g., coherency or interprocessor message) based on an identifier or other characteristic of the message and handle the message accordingly. In one embodiment, the receiving processor implements a filtering mechanism to determine whether it is an intended recipient of a dual-mode message having interprocessor message information. The shared use of a coherency interconnect for both coherency transactions and interprocessor messaging can facilitate the efficient communication of interprocessor messages by, for example, reducing the number of memory look-ups that otherwise would be required. Further, by utilizing the same message format for both coherency-type messages and interprocessor messaging-type messages, relatively little increase in the complexity, if any, of the implementation of the coherency interconnect is needed to facilitate interprocessor messaging as well.

Coherency messages typically are related to the maintenance of a single view of a unified shared memory when that memory is being cached in multiple places in a system. For instance, in this shared memory view, each processor can utilize memory as an addressable entity from address A to address B. Each processor, however, may cache a copy of portions of that address range in caches local to that processor. Since one of those caches may have data which has been modified since the address was brought into the cache, the interconnect which connects the cores together with memory implements a coherency protocol that ensures that whenever a processor makes a reference to this shared address space, it gets a correct, or "coherent" copy of the data from wherever the latest copy resides. Thus, there are coherency messages that the interconnect contains (such as READ, or WRITE) which are sent to other agents on the bus, to which to agents can respond appropriately to provide the latest correct copy of data for a given address and to possibly change the state of their local caches to make sure that the local cache is coherent with the rest of the system caching the shared memory. In contrast, an interprocessor message conventionally is implemented as an interrupt that is initiated from one processor and caused to occur on another processor. Interprocessor messages typically are not associated with a shared address space and memory address values generally are not used in conjunction with interprocessor messages. Rather, interprocessor message generally are implemented as commands and payloads interpreted by the messaging agent.

FIG. 1 illustrates a processing node 100 of a multiprocessor system in accordance with at least one embodiment of the present disclosure. As depicted by processing node 100, some or all of the processing nodes of the multi-processor system each includes a plurality of processors (e.g., processors 102 and 104) connected via a coherency interconnect 106. For purposes of clarity, FIG. 1 omits components of the multiprocessor system not directly related to coherency management and interprocessor messaging, such as, for example, system memory, memory controllers, input/output (I/O devices) and the like.

The processors 102 and 104 each include a processor core 108, an interconnect interface 110, a message filter module 112, a local coherency management module 114, an interprocessor message controller 116, and an interrupt controller 118. The processor core 108 includes one or more instruction execution pipelines 120 and local storage 122, such as a cache, a read-only memory (ROM), an on-chip memory, or combinations thereof.

In at least one embodiment, the coherency interconnect 106 comprises a single coherency mechanism-based interconnect utilized to transmit both interprocessor messages and coherency transactions between the processors 102 and 104 of the processing node 100, as well as between processing nodes of the multi-processor system. As described in greater detail herein, a single message format can be utilized for both coherency transactions and interprocessor messages, thereby allowing interprocessor messages to leverage the coherency-based routing and distribution scheme of the coherency interconnect 106. A message having this single message format is referred to herein as a "dual-purpose" message to reflect that the message can include one of coherency information or interprocessor message information. Although two ("dual") purposes of a single message format are described herein for purposes of illustration, a message format used for messages transmitted via the coherency interconnect can have more than two purposes without departing from the scope of the present disclosure.

It will be appreciated that coherency mechanisms in shared memory systems typically are configured to guarantee delivery of a message to each processor within a coherency domain. Therefore, the software operating at a processor does not need to know the actual physical partitioning implemented within the system (e.g., different virtual processors at the same processor core, different cores on the same processor). Thus, software can be used to affect interprocessor messages for any of a variety of hardware configurations without requiring knowledge of the particular differences between hardware configurations.

The processor core 108 fetches and executes instructions for one or more applications. To illustrate, the processor core 108 can be configured to facilitate one or more virtual processors whereby instructions and control information representative of the virtual processors can be stored in the local storage 122 and executed by the instruction execution pipeline 120. In at least one embodiment, the processor core 108 operates in conjunction with other processors in the multi-processor system whereby messaging between the processors is utilized. Further, the processor core 108 shares memory (e.g., system memory, not shown) with other processors and thus utilizes a coherency mechanism implemented by the coherency interconnect 106 to maintain coherency between the data stored at the local storage 122 of each processor. The interconnect interface 110 comprises an interface to the coherency interconnect 106 and is configured to manage the physical-level signaling and low-level formatting of dual-mode messages between the corresponding processor and the coherency interconnect 106.

The local coherency management module 114 is configured to process coherency-based messages between the corresponding processor and other processors of the multi-processor system that are transmitted via the coherency interconnect 106. The coherency-based messages are commands that reference an address in shared memory. Examples coherency messages include "read," "read with intent to modify," "write," "kill," and the like.

The interprocessor message controller 116, in one embodiment, is configured to process incoming and outbound interprocessor message-type messages. For outbound interprocessor message-type messages, the processor core 108 provides the message information, or payload, to the interprocessor message controller 116, which then generates a dual-mode message using message information and provides dual-mode message to the coherency interconnect 106 via the interconnect interface 110 for transmission. As part of this generation, the interprocessor message controller 116 can, for example, encrypt the message information, perform byte stuffing, and the like. For inbound interprocessor messages, the interprocessor message controller 116 can extract the message information, or payload, from an incoming interprocessor message and provide the message information 126 to the interrupt controller 118. The extraction process can include, for example, decrypting an encrypted payload and the like.

The interrupt controller 118, in one embodiment, is configured to receive message information 126 from the interprocessor message controller 116 and generate an interrupt 128 for handling by an interrupt handling routine 124 executed by the processor core 108. As described in detail herein, the interrupt controller 118 can implement a message queue to identify pending messages so that the interrupt handling routine 124 can take the appropriate actions based on the pending messages. To illustrate, a first OS at a first processor can use an interprocessor message to interrupt a second processor, whereby the interprocessor message acts to direct the second processor to generate a doorbell interrupt or doorbell critical interrupt. When a second OS at the second processor notices this interrupt, the interrupt handler of the second OS can read a shared memory buffer where the first OS has stored data associated with the interrupt. The stored data in the shared memory buffer can include, for example, an indication of the reason for the interrupt, with which the second OS can take the appropriate action. The first OS might use this facility to request the second OS to invalidate MMU context, call a specified function, perform debug-related actions, reschedule processes, and the like.

As noted above, in one embodiment, coherency transactions and interprocessor messages can be transmitted via the coherency interconnect 106 using the same message format. However, it will be appreciated that coherency transactions and interprocessor messages typically are handled by a processor in different ways. To illustrate, a coherency transaction typically is intended for receipt by every processor in the multi-processor system that shares memory so that any resulting coherency information reflects the complete coherency state for the memory. Thus, each processor typically takes some action in response to each coherency transaction transmitted via the coherency interconnect 106. Interprocessor messages in some instances can be intended for only a single processor or a subset of the processors. Further, coherency transactions typically are handled by the local coherency management module 114 without involving the processor core 108, whereas interprocessor messages typically are intended for use by the processor core 108 (via, e.g., an interrupt or exception). Accordingly, because the dual-mode messages received at the processors 102 and 104 via the coherency interconnect 106 can represent coherency transaction or interprocessor messages, the processors 102 and 104 can utilize the message filter module 112 to filter incoming dual-mode messages accordingly.

The message filter module 112, in one embodiment, comprises a hardware based filter mechanism configurable via software (e.g., via software-accessible configuration registers). The message filter module 112 is configured to route incoming dual-mode messages to either the local coherency management module 114 or the interprocessor message controller 116 depending on message type (e.g., a coherency-type message or an interprocessor-type message). Further, in at least one embodiment, the message filter module 112 can utilize one or more filter parameters to reject incoming dual-mode messages not intended for the corresponding processor or to reject dual-mode messages that pose a security risk.

FIG. 2 illustrates an exemplary message format of a dual-mode message 200 utilized to transmit either coherency information or interprocessor message information via a coherency interconnect (e.g., coherency interconnect 106, FIG. 1) in accordance with at least one embodiment of the present disclosure. In the depicted example, the dual-mode message 200 includes a type field 202, an address/payload2 field 204, and a payload1 field 206. The type field 202 includes one or more bits, the values of which are used to identify the dual-mode message 200 as carrying coherency information or interprocessor message information. For example, the type field 202 can include a single bit whereby a bit value of "0" identifies the dual-mode message 200 as a coherency message and a bit value of "1" identifies the dual-mode message 200 as an interprocessor message. The payload1 field 206 is used to store payload information, and the address/payload2 field 204 is used to store address information when the dual-mode message 200 is a coherency message (e.g., the type field 202 is a "0") and is used to store payload information when the dual-mode message 200 is an interprocessor message (e.g., the type field 202 is a "1"). Thus, because interprocessor messages do not utilize addressing, both the address/payload2 field 204 and the payload1 field 206 can be utilized together as a joint payload field to carry payload information. The payload information can be stored contiguously across both fields 204 and 206 (e.g., the most significant bit of the address/payload2 field 204 is the most significant bit of the payload information), or the payload information may be segmented and reordered across the fields 204 and 206 (e.g., the most significant bit of the payload1 field 206 is the most significant bit of the payload information).

FIGS. 3-6 illustrate examples of dual-mode message handling at a processor (e.g., the processor 102) of the multi-processor system of FIG. 1 in accordance with at least one embodiment of the present disclosure. As depicted in FIGS. 3-6, the message filter module 112 is configurable via one or more configuration registers (e.g., configuration registers 302, 304 and 606), whereby the message filter module 112 filters incoming dual-mode messages based on the configuration information of the configuration registers. The configuration information can include, for example, particular values or a range of values that are used to permit, or alternately deny, incoming dual-mode messages having a value in a particular field that matches a particular value, or falls within or outside of the identified range of values. For the purpose of discussion, is it assumed in the examples of FIGS. 3-5 that the configuration register 302 stores an upper-bound mask value (e.g., 1011 XXXX) and the configuration register 304 stores a lower-bound mask value (e.g., 1000 XXXX), whereby the message filter module 112 is configured to permit incoming dual-mode messages that carry interprocessor message information (e.g., have a bit value of "1" in their type field 202) and have a payload value that falls between the masked range defined by the upper-bound mask value and the lower-bound mask value. It is assumed in the example of FIG. 6 that the configuration register 606 stores an identifier whereby the message filter module 112 is configured to permit incoming dual mode messages that carry interprocessor message information and have a payload value whose most-significant bits match the identifier.

FIG. 3 illustrates an example whereby a dual-mode message 300 having coherency information in its payload is transmitted to the processor 102 via the coherency interconnect 106. As depicted, the dual-mode message 300 includes a value of "0" in its type field 202, thereby identifying it as a coherency message. Accordingly, the message filter module 112 forwards the dual-mode message 300 to the local coherency management module 114 for processing. The processing of the dual-mode message 300 by the local coherency management module 114 can include, for example, extracting the coherency transaction represented by the address/payload2 field 204 and the payload1 field 206 from the dual-mode message 300 and performing one or more coherency actions based on the coherency transaction, such as, for example, snooping a cache hierarchy of the processor core 108 to determine the coherency state of an identified memory location and reporting the coherency state to the other processors of the multi-processor system by generating another dual-mode message for distribution via the coherency interconnect 106. In another embodiment, the coherency state of a snoop is not a separate transaction but instead is indicated as separate signaling (not shown) that is considered part of the original transaction.

FIG. 4 illustrates an example whereby a dual-mode message 400 having interprocessor message information in its payload is transmitted to the processor 102 via the coherency interconnect 106. As depicted, the dual-mode message 400 includes a value of "1" in its type field 202, thereby identifying it as carrying interprocessor message information in both its address/payload 2 field 204 and its payload1 field 206. Accordingly, as it is identified as an interprocessor message from its type field 202, the message filter module 112 determines whether it meets the filtering constraints represented by the values in the configuration registers 302 and 304. In this example, the payload value is "1011 1100," which falls within the masked payload value range represented by the values in the configuration registers 302 and 304. Accordingly, the message filter module 112 permits the dual-mode message 400 to be forwarded to the interprocessor message controller 116 for processing.

The interprocessor message controller 116, in one embodiment, extracts the value from the payload1 field 206 of the dual-mode message 400 and provides the payload value as a message 402 to the interrupt controller 118. The extraction of the value from the payload1 field 206 can include any of a variety of processes, such as decryption of the payload value, removing stuffing bytes, error code correction, and the like.

In response to receiving the message 402, the interrupt controller 118 generates an interrupt 428 for the processor core 108 and places the message 402 into a message queue 404. The message queue 404, in one embodiment, is a global message queue used to queue interrupt messages generated from interprocessor messaging as well as other interrupt sources (such as, for example, input/output (I/O) transactions). In response to receiving the interrupt 428, the processor core 108 invokes the interrupt handling routine 124 to process the pending messages in the message queue 404. The messages can be provided to the message queue 404 using, for example, the message send (msgsnd) processor control instruction of the Power ISA™ v2.03 specification. Likewise, a message clear (msgclr) processor control instruction of the Power ISA™ v2.03 specification can be used to clear a pending message from the message queue 404.

Figure 5:
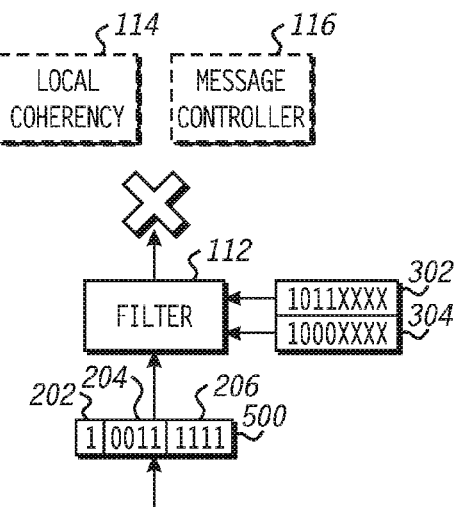
FIG. 5 is a diagram illustrating handling of another interprocessor message from a shared coherency/interprocessor messaging interconnect in accordance with at least one embodiment of the present disclosure.

FIG. 5 illustrates an example whereby a dual-mode message 500 having interprocessor message information in its payload is transmitted to the processor 102 via the coherency interconnect 106. As depicted, the dual-mode message 500 includes a value of "1" in its type field 202, thereby identifying it as carrying interprocessor message information in both its address/payload2 field 204 and its payload1 field 206. Accordingly, as it is identified as an interprocessor message from its type field 202, the message filter module 112 determines whether it meets the filtering constraints represented by the values in the configuration registers 302 and 304. In this example, the payload value is "0011 1100," which falls outside the masked payload value range represented by the values in the configuration registers 302 and 304. Accordingly, the message filter module 112 ignores or otherwise denies the dual-mode message 500, thereby preventing its distribution to the interprocessor message controller 116.

Figure 6:
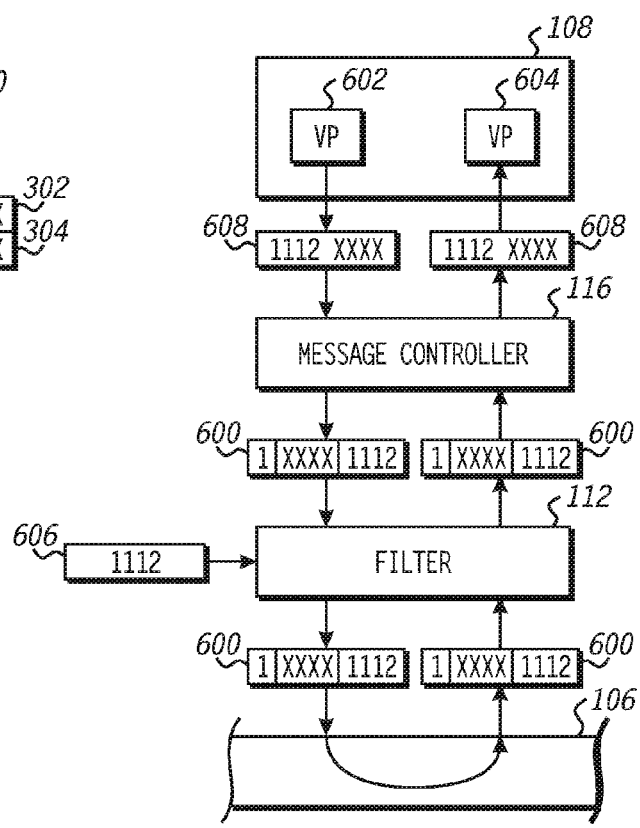
FIG. 6 is a diagram illustrating handling of another interprocessor message between virtual processors at the same processor core in accordance with at least one embodiment of the present disclosure.

FIG. 6 illustrates an example whereby a dual-mode message 600 having interprocessor message information in its payload is transmitted from one virtual processor (VP 602) to another virtual processor (VP 604) at the processing core 108 of the processor 102 via the coherency interconnect 106. As depicted, the VP 602 generates interprocessor message information 608 for receipt by the VP 604. As illustrated, the interprocessor message information 608 can include an identifier value (e.g., "1112") associated with the VP 604, and further can include any payload information to be utilized by the VP 604. As discussed above, virtual processors can be migrated between processors as appropriate. However, rather than keeping track of the particular location of the VP 604 at any given time, the processing core 108 instead submits the interprocessor message information 608 to the interprocessor message controller 116 for transmission via the coherency interconnect 106. The interprocessor message controller 116 generates the dual-mode message 600 with the identifier value and payload in the address/payload2 field 204 and the payload1 field 206, and a value of "1" in its type field 202, thereby identifying it as carrying interprocessor message information in both its address/payload 2 field 204 and its payload1 field 206. The dual-mode message 600 then is submitted to the coherency interconnect 106 via the message filter module 112.

The coherency interconnect 106 distributes the dual-mode message 600 to connected processors as appropriate. As part of this distribution, the dual-mode message 600 is reflected back to the processor 102, whereby it is filtered by the message filter module 112. In the illustrated embodiment, because the VP 604 is resident at the processor 102, a configuration register 606 is configured (e.g., by a hypervisor) to store the identifier "1112" associated with the VP 604 so that messages intended for the VP 604 are passed through by the message filter module 112. Thus, when the message filter module 112 receives the dual-purpose message 600, it is identified as an interprocessor message from its type field 202 and the message filter module 112 determines that it meets a filtering constraint represented by the values in the configuration registers 606. Accordingly, the message filter module 112 permits the dual-mode message 600 to be forwarded to the interprocessor message controller 116 for processing, whereby the interprocessor message controller 116 can initiate an interrupt for handling by the VP 604 based on the VP identifier and the payload information.

Figure 7:
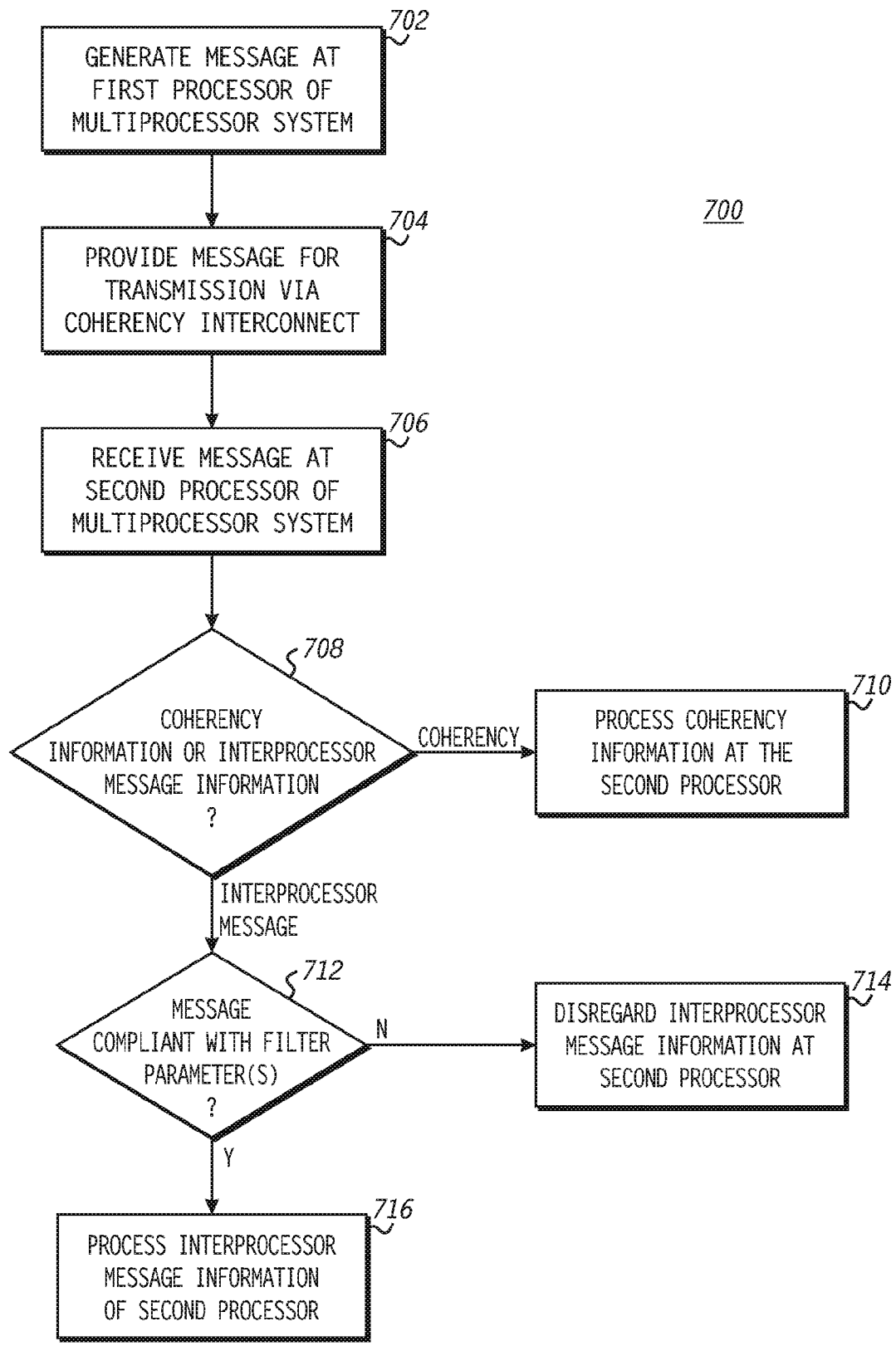
FIG. 7 is a flow diagram illustrating an example method for communicating coherency information and interprocessor message information via a shared coherency/interprocessor messaging interconnect in accordance with at least one embodiment of the present disclosure.

FIG. 7 illustrates an example method 700 for communicating and processing a dual-mode message in accordance with at least one embodiment of the present disclosure. For ease of illustration, the method 700 is described in the context of the multiprocessor system of FIGS. 1 and 2.

At block 702, a first processor (e.g., processor 104) generates a dual-mode message by storing either coherency information or interprocessor message information in the payload1 field 206 of the dual-mode message, and configures the type field 202 to reflect the payload type. At block 704, the first processor communicates the dual-mode message to the other processors of the multiprocessor system by providing the dual-mode message to the coherency interconnect 106 for transmission.

At block 706, the dual-mode message is received at a second processor (e.g., processor 102) of the multiprocessor system. At block 708, the message filter module 112 accesses the type field 202 of the dual-mode message to determine whether the payload1 field 206 contains coherency information or interprocessor message information. In the event that the value of the type field 202 identifies the payload as coherency information, at block 710 the message filter module 112 provides the coherency information to the local coherency management module 114 for processing. The processing of the coherency information at the local coherency management module 114 can include, for example, determining a coherency state of a coherency granule identified in the coherency information of the dual-mode message by snooping a cache hierarchy of the processor core 108 and then generating another dual-mode message that includes an indication of the determined coherency state. The other dual-mode message then can be communicated to the other processors via the coherency interconnect 106.

Otherwise, in the event that the value of the type field 202 identifies the payload as interprocessor message information, at block 712 the second processor determines whether the dual-mode message is intended for the second processor. In one embodiment, the second processor determines whether it is an intended recipient of the dual-mode message by using the message filter module 112 to determine one or more filter parameters and apply them to the dual-mode message to determine whether the dual-mode message is compliant with the one or more filter parameters. As described above, the filter can include one or more configuration registers, such as configuration registers 302 and 304 of FIG. 3, that identify the one or more filter parameters. The filter parameters can include, for example, particular values or value ranges that can be applied to various fields of the dual-mode message, such as to the address/payload2 field 204 or the payload1 field 206.

In the event that the dual-mode message is not compliant with the one or more filter parameters, and thus identified as not intended for the second processor, at block 714 the second processor disregards the interprocessor message information of the dual-mode message. The second processor can disregard the interprocessor message information by ignoring it, overwriting it, sending a reply message indicating that the dual-mode message has been disregarded, and the like.

In the event that the dual-mode message is compliant with the one or more filter parameters, and thus identified as intended for the second processor, at block 716 the second processor processes the interprocessor message information of the dual-mode message. Processing of the interprocessor message information at the second processor can include, for example, generating an interrupt for handling by the processor core 108 of the second processor. Other processing techniques may be implemented without departing from the scope of the present disclosure.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

As used herein, the term "bus" is used to refer to a plurality of signals or conductors that may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
    communicating a first message between processors of a multiprocessor system via a coherency interconnect, the first message comprising coherency information that is associated with a memory address of a shared address space of the multiprocessor system; and
    communicating a second message between processors of the multiprocessor system via the coherency interconnect, the second message comprising interprocessor message information that is not associated with a memory address of the shared address space.

2. The method of claim 1, wherein:
    communicating the first message comprises generating the first message in a message format having a type field, the first message comprising a first value in the type field; and
    communicating the second message comprises generating the second message in the message format, the second message comprising a second value in the type field.

3. The method of claim 2, further comprising:
    receiving the first message and the second message at a processor of the multiprocessor system;
    accessing, at the processor, the type field of the first message to identify the first message as comprising coherency information;
    processing, at the processor, the coherency information in response to identifying the first message as comprising coherency information;
    accessing, at the processor, the type field of the second message to identify the second message as comprising interprocessor message information; and
    processing, at the processor, the interprocessor message information in response to identifying the second message as comprising interprocessor message information.

4. The method of claim 1, further comprising:
    processing the interprocessor message information at a first processor of the multiprocessor system in response to determining that the second message is intended for the first processor.

5. The method of claim 4, wherein processing the interprocessor message information at the first processor comprises generating an interrupt based on the interprocessor message information.

6. The method of claim 4, further comprising:
    disregarding the interprocessor message information at a second processor of the multiprocessor system in response to determining that the second message is not intended for the second processor.

7. The method of claim 1, wherein communicating a second message between processors of a multiprocessor system via the coherency interconnect comprises:
    communicating the second message from a first virtual processor of a processor of the multiprocessor system to the coherency interconnect; and communicating the second message from the coherency interconnect to a second virtual processor of the processor.

8. A method comprising:
receiving, at a first processor of a multiprocessor system, a first message via a coherency interconnect;
accessing a type field of the first message to determine whether the first message includes coherency information that is associated with a memory address of a shared address space of the multiprocessor system or interprocessor message information that is not associated with a memory address of the shared address space;
in response to determining the first message includes coherency information, performing a coherency action at the first processor based on the coherency information; and
in response to determining the first message includes interprocessor message information, selectively processing the interprocessor message information at the first processor.

9. The method of claim 8, wherein accessing the type field of the first message comprises:
determining the first message includes coherency information in response to the type field of the first message having a first value; and
determining the first message includes interprocessor message information in response to the type field of the first message having a second value.

10. The method of claim 8, wherein performing a coherency action at the first processor comprises:
generating, at the first processor, a second message comprising coherency information in response to the coherency information of the first message, the second message having a same message format as the first message; and
communicating the second message to at least a second processor of the multiprocessor system, the second message including a representation of a coherency state of a coherency granule for a cache hierarchy of the first processor.

11. The method of claim 8, further comprising:
providing the first message to the coherency interconnect from a first virtual processor of the first processor, the interprocessor message information including an identifier associated with a second virtual processor;
wherein receiving the first message comprises comparing the identifier with a filter parameter to determine whether the second virtual processor is at the first processor; and
wherein selectively processing the interprocessor message information at the first processor comprises selectively providing the interprocessor message information of the first message to the second virtual processor of the first processor based on the comparison of the identifier with the filter parameter.

12. The method of claim 8, wherein selectively processing the interprocessor message information comprises:
processing the interprocessor message information at the first processor in response to determining the first message is compliant with at least one filter parameter; and
disregarding the interprocessor message information at the first processor in response to determining the first message is not compliant with at least one filter parameter.

13. The method of claim 12, wherein processing the interprocessor message information comprises generating an interrupt at the first processor based on the interprocessor message information.

14. A system comprising:
a coherency interconnect coupleable to a plurality of processors;
a first processor comprising:
an interface configured to receive messages from the coherency interconnect, the messages each comprising one of coherency information that is associated with a memory address of a shared address space of the system or interprocessor message information that is not associated with a memory address of the shared address space;
a coherency management module configured to process coherency information obtained from one or more of the messages; and
an interrupt controller configured to generate an interrupt based on interprocessor message information obtained from one or more of the messages.

15. The system of claim 14, wherein the messages each comprises a same message format.

16. The system of claim 15, wherein the message format comprises a type field and a payload field, the type field configured to identify a payload in the payload field as comprising one of coherency information or interprocessor message information.

17. The system of claim 16, the first processor further comprising:
a message filter module configured to selectively provide the payload of a message received via the coherency interconnect to one of the coherency management module or the interrupt controller based on the type field of the message.

18. The system of claim 14, wherein the coherency management module is configured to generate a message comprising coherency information and provide the message for communication to at least a second processor of the multiprocessor system via the coherency interconnect.

19. The system of claim 14, the first processor further comprising:
a message filter module configured to selectively provide interprocessor message information from a message received via the coherency interconnect to the interrupt controller based on at least one filter parameter.

20. The system of claim 14, wherein:
the first processor implements a first virtual processor, the first virtual processor to providing a select message to the coherency interconnect from a first virtual processor of the first processor, the select message comprising interprocessor message information including an identifier associated with a second virtual processor;
the coherency management module is to compare the identifier of the select message with a filter parameter to determine the second virtual processor is at the first processor; and
the coherency management module selectively provides the interprocessor message information of the select message to the second virtual processor of the first processor based on the comparison of the identifier with the filter parameter.

* * * * *